March 29, 1938.  H. D. RICE  2,112,544
LAMINATED ARTICLE
Filed Sept. 26, 1935
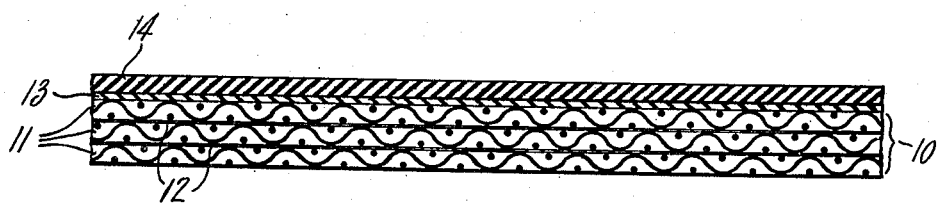
INVENTOR.
HAROLD de BLOIS RICE
BY
ATTORNEY.

Patented Mar. 29, 1938

2,112,544

UNITED STATES PATENT OFFICE 2,112,544

LAMINATED ARTICLE

Harold D. Rice, Barrington, R. I., assignor to United States Rubber Products, Inc., New York, N. Y., a corporation of Delaware Application September 26, 1935, Serial No. 42,189

8 Claims. (Cl. 154—54.5)

This invention relates to improvements in laminated articles, more particularly articles having a coating of material comprising a synthetic rubber-like polymer having high solvent resistance.

There are at the present time a number of synthetic rubber-like polymers which have exceptionally high solvent resistance and which may be compounded with varying amounts of different compounding materials, and sometimes with small amounts of rubber, for the production of articles having a high resistance to gasoline, oil and other solvent materials which are known to have an exceedingly deteriorating effect on natural rubber compositions. These synthetic rubber-like polymers have been suggested for the manufacture of hose, drum and tank linings, packing rings and gaskets, washers, printer's blankets and printing plates, inking rollers and like articles where a high solvent resistance is essential to the proper functioning of the product. Various kinds of these synthetic rubber-like polymers which may be obtained in a state of polymerization resembling unvulcanized rubber and which may be shaped and then further polymerized as by heating until the material assumes a condition similar to compounded vulcanized rubber by a so-called curing or vulcanizing operation, are known. One such material is so-called chloroprene plastic polymer which is a polymer of chloro-2-butadiene-1,3 and which may be prepared as described in the Journal of the American Chemical Society, volume 53, No. 11, November, 1931 pages 4197 to 4226. These chloroprene polymers when used are generally compounded with such materials as rosin, magnesium oxide, sulphur, and zinc oxide to prevent scorching at milling temperatures and to accelerate the cures at higher temperatures, and to improve the socalled vulcanizate. With calendered or tubed stocks, it is some times found desirable to compound the chloroprene plastic polymer with softeners such as brown factice, coumarone resin, cotton-seed oil and the like, and for various other purposes with filler materials such as are used in compounding natural rubber stocks, for example, whiting, clay, carbon black, red oxide, asbestos and the like. In order to improve the calendering and tubing properties and to prevent scorching and setting up on the mill of these chloroprene plastic polymers, it has been suggested (U. S. Patent to De Holczer, No. 1,967,292 granted July 24, 1934) to compound the material with a plastic, elastic reaction product of 1 molar proportion of an aromatic compound having the general formula R—$C_6H_4$R' where R and R' each represent hydrogen or a saturated hydrocarbon radical containing more than one carbon atom, with about 1 to 3 molar proportions of ethylene chloride. This plastic, elastic reaction product is itself a polymer very resistant to solvents, such as gasoline and oil, and is advantageously used for one reason or another as a compounding ingredient for natural rubber and the various known synthetic rubber-like polymers. Other synthetic rubber-like polymers which may be compounded with rubber, filler materials, rubber accelerators, anti-oxidants, activators, and which may be advantageously compounded with the plastic, elastic reaction product of the aromatic compound and ethylene chloride described above, are the so-called olefin polysulphide plastics which are well known organic polysulphides derived by the reaction of polysulphides on methylene bodies such as methylene dihalides or formaldehyde, or other olefin bodies, particularly dihalides such as the dihalides of ethylene, propylene, butylene, and the like which have the empirical formula $C_nH_{2n}S_x$. Other synthetic rubber-like polymers such as polymerized isoprene and polymerized butadiene are likewise known for their high solvent resistance.

It has been suggested in making solvent resistant laminated articles to provide under the face of the synthetic rubber-like polymer which is to be exposed to the solvent, a cushioning layer of masticated rubber or rubber deposited from a rubber cement. This method of backing the exposed surface of synthetic rubber-like polymers with a natural rubber-like composition, to which of course the synthetic rubber-like polymers may be vulcanized, provides a less expensive method of utilizing the solvent resistant properties of these synthetic rubber-like polymers than when the entire resilient portion of the article is made of the polymer, and oftentimes improves the physical properties of the product by virtue of the inherent lesser tensile strength and elongation of some of the synthetic rubber-like polymers as compared to natural rubber compositions.

I have found, however, that the life of a product is seriously diminished by the utilization of backing or cushioning layers of masticated rubber or rubber deposited from solvent cement since the coating of the synthetic rubber-like polymer which is exposed to the solvent, while having a high resistance to swelling by solvents, is permeable to the solvent and hence the solvent in penetrating through the synthetic polymer coating presents itself to the natural rubber backing or cushioning layer and disintegrates the same in a manner similar to the disintegration of similar products made with the entire resilient portion, exposed as well as cushioning parts, composed of a natural rubber composition.

The present invention relates to laminated articles having a coating of material comprising a synthetic rubber-like polymer having high solvent resistance and a backing of rubber which has the improved properties of a higher solvent resistance than masticated rubber or rubber deposited from a solvent solution of rubber so that the improved physical properties and lessened expense of an article having a natural rubber backing and a coating of synthetic rubber-like polymer is maintained without the deteriorating effects incident to the use of backings made of masticated rubber or rubber deposited from rubber cements.

In carrying out the invention, the article is provided with a backing layer of the solids deposit of a rubber latex composition and a coating over the same comprising a synthetic rubber-like polymer having a high solvent resistance. The rubber backing, if applied to an article base, may be deposited directly from latex by dipping and drying, or dipping and coagulating, or by similar spreading or spraying methods. The latex rubber backing may, if desired, be molded on the base, or molded separate therefrom and later applied thereto. The backing may be composed of a pre-formed sheet of rubber deposited directly from latex in a manner well known in the art. The direct solids deposit of a rubber latex composition if prepared separate from a base to which it is to be attached may be molded or cemented onto the base. The coating of synthetic rubber-like polymer over the rubber backing may be applied by dipping or spreading an organic solvent solution or an aqueous dispersion of the rubber-like polymer or by a simple molding or calendering operation. The synthetic rubber-like polymer may be vulcanized to the natural rubber backing layer which in turn may be vulcanized to the base. If desired, for improved adhesion of the synthetic rubber-like coating to the backing of the solids deposit of the rubber latex composition, there may be applied a few coats of a rubber cement between the two, the thickness of the same being insufficient to deleteriously affect the solvent resistance of the composite resilient material.

The drawing illustrates one example of a composite article produced according to the present invention—namely, a printer's blanket,—but this is intended to be merely illustrative of the invention which is broad in scope and which may be applied to the manufacture of lined tanks and cars, packing rings and gaskets, washers, printing plates, inking rollers and the like where improved solvent resistance is essential to the satisfactory utilization of the product. The figure shows a portion of a printer's blanket with a base 10 formed of superposed layers of fabric 11 bonded together by an adhesive material 12 such as a solvent rubber cement or a latex cement. Superposed on the base 10 is a backing 13 of the direct solids deposit of a rubber latex composition, on top of which is a coating 14 of synthetic rubber-like polymer having high solvent resistance.

The following detailed procedure of manufacturing the printer's blanket illustrated in the drawing is included merely as a further example of carrying out the present invention but without intention of limiting the same. The base may be composed of three fabric plies 11 bonded together with a rubber-naphtha adhesive cement 12 which is well known in the art. The backing layer 13 may be made by spreading onto the fabric base latex of the following composition, in which the various ingredients have functions well known in the art:

| | Parts |
|---|---|
| Rubber (as latex of 65.7% solids content) | 100 |
| Formalin | 4.65 |
| Water | 3.0 |
| Potassium hydroxide | 0.20 |
| Crimson antimony | 20 |
| Sulfur | 6.8 |
| Whiting | 75 |
| Red iron oxide | 12 |
| Zinc oxide | 2 |
| Potassium hydroxide | 0.7 |
| Sodium isopropyl-naphthalene sulfonate | 0.6 |
| Glue | 6 |
| Water | 70 |
| Heptaldehyde-aniline condensate | 1.50 |
| Acetone-diphenylamine condensate | 0.75 |
| Solvent naphtha | 1.5 |
| Glue | 0.375 |
| Sodium isopropyl-naphthalene sulfonate | 0.375 |
| Water | 6.75 |

(Total solids, 62.1%)

The spread latex coat may be dried at 90° C. and additional coats applied to the surface with similar drying after each operation until the desired thickness of films has been spread. It is preferable to spread the latex so that each dried coat will be about .0015 inch in thickness. The thickness of the resilient surface comprising both the solids deposit of the latex composition and the surfacing of the synthetic rubber-like polymer is preferably about .025 inch and this may be ground down in the usual manner to about .023 inch. The proportionate thickness of the latex deposit and the rubber-like polymer may vary as desired, but for exceptionally high grade printer's blankets, 4 to 5 coats of latex rubber backing having a composite thickness of about .006 to .007 inch is preferred, the remainder of the resilient coating being the rubber-like polymer.

On top of the final latex coating is spread one or two coats if desired of very tacky naphtha cement to aid the adhesion of the latex rubber backing to the coating of synthetic rubber-like polymer. The total thickness of this cement is practically negligible being about .001 to .0015 inch and the amount of rubber in this adhesive layer is insufficient to materially affect the solvent resistant properties of the blanket as a whole.

The synthetic rubber-like polymer is preferably applied in the form of a solvent cement of about 30% solid content using coal tar naphtha, ethylene dichloride, or benzol as a solvent. A formula for such a synthetic rubber-like polymer composition made of chloroprene polymer and a plastic, elastic reaction product of one molar proportion of an aromatic compound having the general formula R—C₆—H₄—R' where R and R' each represent hydrogen or a saturated aromatic hydrocarbon radical containing more than one carbon atom with about 1 to 3 molar proportions of ethylene chloride is as follows:

| | Parts |
|---|---|
| Chloroprene plastic polymer | 100 |
| Plastic, elastic reaction product | 15 |
| Carbon black | 50 |
| Whiting | 50 |
| Zinc oxide | 10 |
| Magnesium oxide | 10 |
| Rosin | 5 |
| Cotton-seed oil | 5 |
| Sulphur | 0.5 |

Each coating of the rubber-like polymer cement is spread and dried at about 90° C. or a lesser temperature and has preferably a thickness when dried of about .001 inch. With four or five coats of a latex composition as a backing having a total thickness of about .006 inch and two coats of a rubber cement having a thickness of .001 to .0015 inch, 18 coats of the rubber-like polymer cement having an overall thickness of .018 inch is satisfactory. After spreading of the blanket and drying of the last coat, the blanket may be cured in a press or in steam or air. In a press, the blanket is preferably cured or vulcanized for 40 minutes at 60 lbs. steam pressure, while in air or steam, the blanket is heated to 270° F. in an hour and allowed to remain at that temperature for three hours to complete the curing operation. After curing, the surface may be ground if desired to smooth the outer surface and render the entire composite article uniform in thickness.

The unusual oil resistant properties of laminated articles coated with these rubber-like solvent resistant polymers and with a rubber backing of the direct solids deposit of a latex composition as compared with similar articles having a backing of masticated or calendered rubber or a deposit from a rubber cement is not easily explained in view of the high solvent resistance of the synthetic rubber-like polymers. It has been found, however, that despite the solvent resistant properties of these rubber-like polymers, they are permeable to oil, gasoline and other organic solvents, but, unlike ordinary calendered rubber and rubber cement stocks, they appear to absorb solvents up to a definite saturation point and no further, and they apparently keep their original physical properties when so saturated at least for great periods of time. Masticated rubber and solvent spread stocks, on the other hand, are easily destroyed since they are able to continuously absorb gasoline, oil and other solvents and apparently reach no saturation point, the physical properties of the rubber degenerating until the rubber has practically disintegrated into a material having no tensile strength at all. I have discovered, however, that a layer of the direct solids deposit of a latex composition has a relatively high degree of resistance to oil and may be utilized for extended periods of time without showing the disintegration incident to the use of calendered and cement rubber stocks. Masticated rubber such as calendered stocks of course has a broken down structure and rubber deposits from rubber solvent cements likewise have a broken down structure and also are to some extent de-polymerized and it may be because of these changes in the structure or constitution that there is a decreased resistance to solvent of calendered rubber or rubber cement deposits over rubber latex deposits. Regardless of the correctness in whole or in part of the theory here proposed, the oil absorption of the solids deposit of an aqueous dispersion of rubber is much less than the oil absorption of calendered or cement spread stocks and this property is here utilized in a novel manner. The following table shows the oil absorption of (1) a present day type of high grade solvent rubber cement-spread printer's blanket, (2) a present day type of cheaper grade of high filler calendered rubber stock printer's blanket, (3) a printer's blanket with the resilient or printing portion made entirely of the solids deposit of a latex composition similar to that used above for the backing layer only, (such structure being claimed specifically in my co-pending application, Ser. No. 676,854 filed June 21, 1933 now Patent 2,027,322 of which the present invention is a variation or improvement), and (4) a printer's blanket made according to the present invention as above. The oil absorption data in the following table are expressed in grams of oil absorbed over an area of 100 sq. cm. after the rubber surface has been in contact with a two-inch head of oil for 20 hours at 25° C.

| Type of blanket | Oil absorption |
|---|---|
| Solvent cement spread (high grade) | .66 |
| Calendered rubber-high filler (cheaper grade) | .50 |
| Resilient portion entirely of latex | .39 |
| Resilient portion laminated as described above | .10 to .16 |

Where there is an exposed cross section of the laminated article, as in the edges of an ordinary printer's blanket, so that the solvent material which tends to disintegrate the rubber may come in contact directly with the rubber backing layer through the edges, there is of course an even greater chance for swelling and ultimate deterioration of the rubber backing layer.

While specific embodiments of the invention have been described, it is advised that numerous modifications may be made therein and it is not desired to limit the invention otherwise than as set forth in the appended claims.

Having thus described my invention what I claim and desire to protect by Letters Patent is:

1. An article of manufacture having a base, a coating of material comprising a synthetic rubber-like polymer having high resistance to swelling by solvents but which is permeable to solvents, and a layer, intermediate said base and said coating and of a thickness greater than .005 inch, of the direct solids deposit of a rubber latex composition.

2. An article of manufacture having a base, a coating of material comprising a chloroprene plastic polymer, and a layer, intermediate said base and said coating and of a thickness greater than .005 inch, of the direct solids deposit of a rubber latex composition.

3. An article of manufacture having a base, a coating of material comprising an olefin polysulphide plastic, and a layer, intermediate said base and said coating and of a thickness greater than .005 inch, of the direct solids deposit of a rubber latex composition.

4. An article of manufacture having a base, a coating of material comprising a butadiene plastic polymer, and a layer, intermediate said base and said coating and of a thickness greater than .005 inch, of the direct solids deposit of a rubber latex composition.

5. A printer's blanket comprising a base, a printing layer of material comprising a synthetic rubber-like polymer having a high resistance to swelling by solvents but which is permeable to solvents, and a layer, intermediate said base and said printing layer and of a thickness greater than .005 inch, of the direct solids deposit of a rubber latex composition.

6. A printer's blanket comprising a base, a printing layer of material comprising a chloroprene plastic polymer, and a layer, intermediate said base and said printing layer and of a thickness greater than .005 inch, of the direct solids deposit of a rubber latex composition.

7. A printer's blanket comprising a base, a printing layer of material comprising an olefin polysulphide plastic, and a layer, intermediate said base and said printing layer and of a thickness greater than .005 inch, of the direct solids deposit of a rubber latex composition.

8. A printer's blanket comprising a base, a printing layer of material comprising butadiene plastic polymer and a layer, intermediate said base and said printing layer and of a thickness greater than .005 inch, of the vulcanized direct solids deposit of a rubber latex composition.

HAROLD D. RICE.